June 5, 1956     E. WALLACE     2,748,554
TRIMMER WITH OSCILLATING SHEARS
Filed Dec. 3, 1953     2 Sheets-Sheet 1
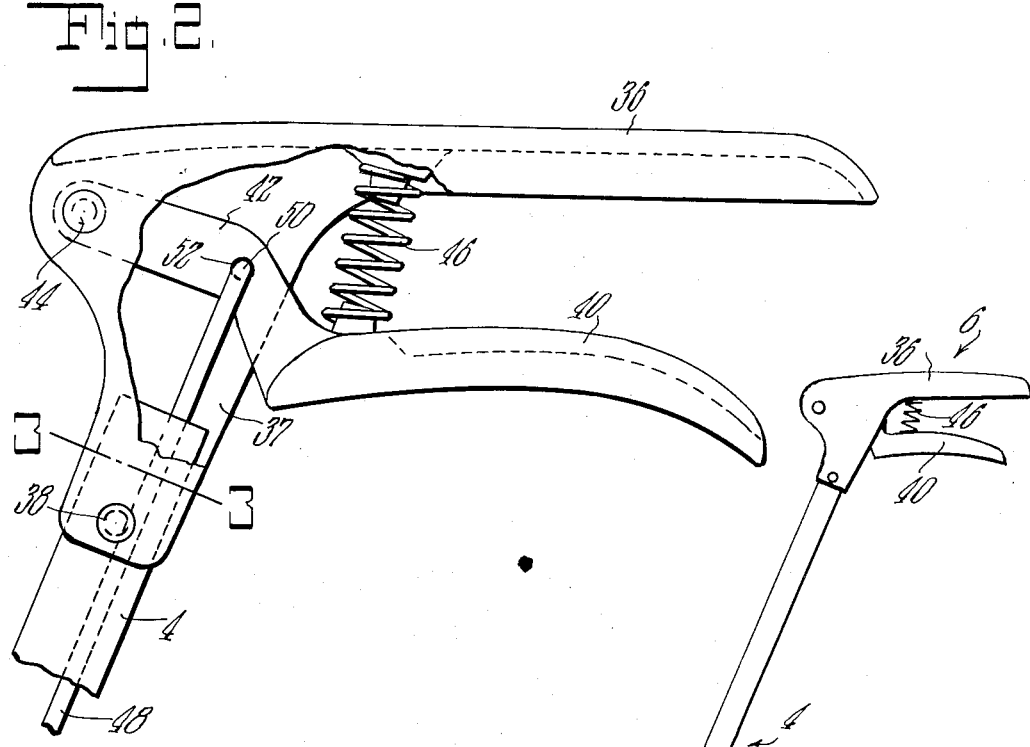
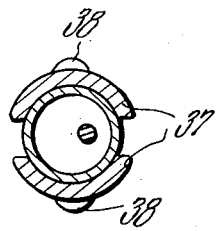
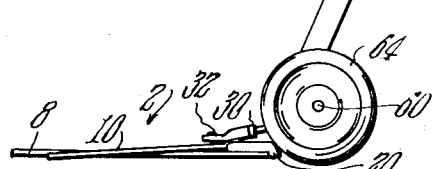
INVENTOR.
Edward Wallace.

June 5, 1956  E. WALLACE  2,748,554
TRIMMER WITH OSCILLATING SHEARS
Filed Dec. 3, 1953  2 Sheets-Sheet 2
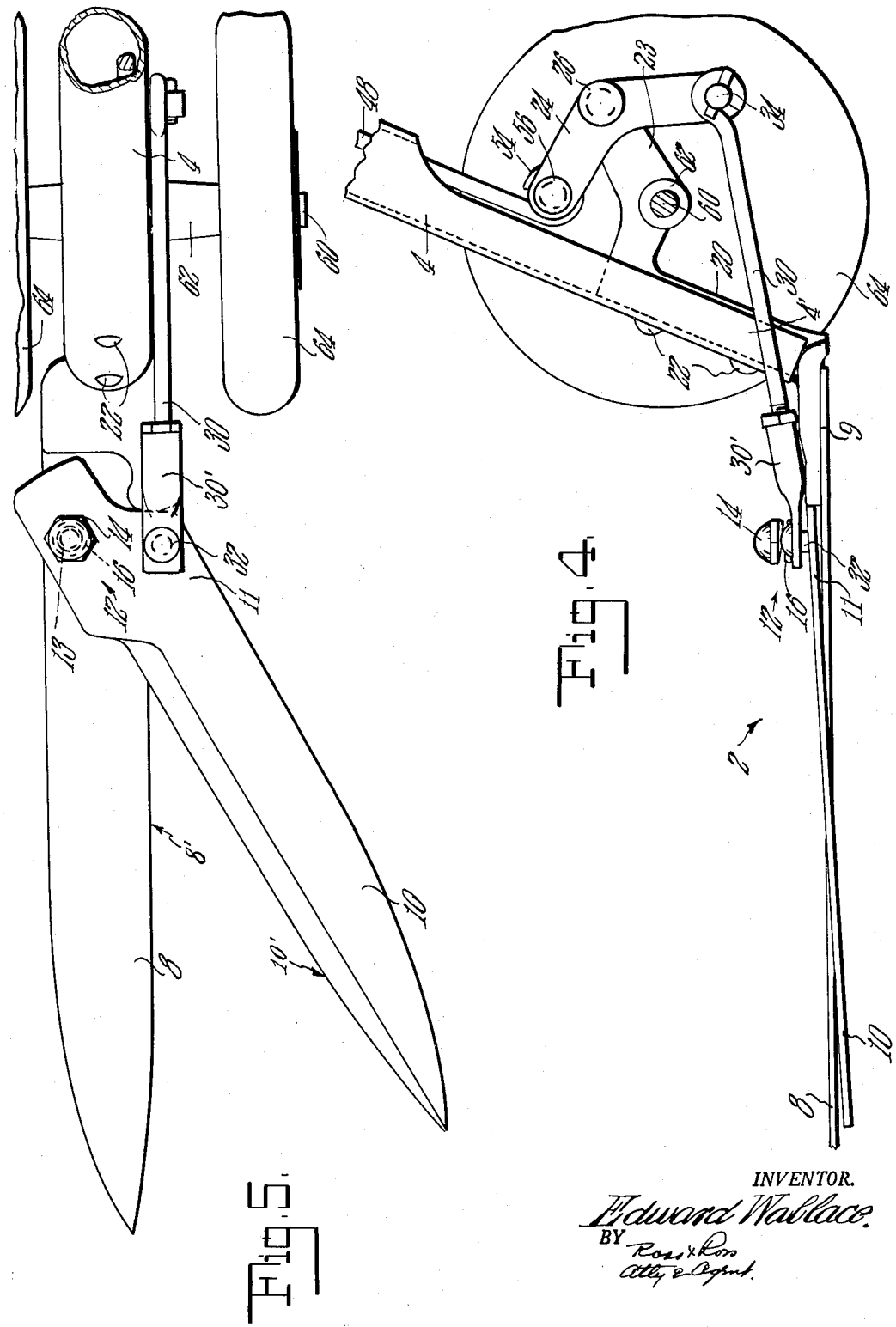
INVENTOR.
Edward Wallace.
BY Ross & Ross
Atty & Agent.

United States Patent Office 2,748,554
Patented June 5, 1956

2,748,554

TRIMMER WITH OSCILLATING SHEARS

Edward Wallace, Longmeadow, Mass.

Application December 3, 1953, Serial No. 395,945

3 Claims. (Cl. 56—241)

This invention relates to shears for grass and the like and is directed to shears wherein the blades thereof are remotely operated.

The principal objects of the invention are directed to the provision of a shear having operating means remotely located from the cutting blades. That is to say, the user of the shears may operate the blades of the shears when in an erect position thereby to obviate kneeling down or bending over as is the case with an ordinary shear.

As a special feature of the invention, the construction is such that one blade is pushed towards the other blade for the cutting action thereby to obtain a rapid and clean cut, and is accomplished by squeezing a lever towards a handle at the upper end of a staff extending upwardly from the shear blades. By squeezing the lever, a rod acts with a pulling action on a rod pushing on the blade so that operation while remote from the blades is readily accomplished with practically no effort.

As a further feature of the invention, wheel means is associated with the lower end of the staff and blades of the shear so that the shear may be readily and easily rolled along the ground by the user.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is an elevational view of a shear embodying the novel features of the invention;

Fig. 2 is an enlarged side elevational view with parts broken away of the handle and lever at the upper end of the staff of the shears;

Fig. 3 is a sectional view on the line 3—3 of Fig. 2;

Fig. 4 is an enlarged side elevational view of the lower shearing portion of the shear shown in Fig. 1 with one of the wheels omitted; and Fig. 5 is a plan view of the shear portion shown in Fig. 4.

Referring now to the drawings more in detail, the invention will be fully described.

As shown in Fig. 1, the shear in a general way includes a lower shear portion 2, a more or less vertical staff 4 and an upper operating portion 6.

The shear portion includes lower and upper blades 8 and 10 having inner sharpened edges 8' and 10', as shown in Figs. 4 and 5. Said blades are pivotally connected at 12 for swinging between the open position shown and a closed position. The pivotal connection 12 preferably includes a bolt 13 secured to the lower blade on which the upper blade is swingable and a crown nut 14 below which is a spring 16 so that the blades are urged towards one another for their cutting function.

A bracket 20 is fixed to the rear end portion 9 of the lower blade 8 by any suitable means and the staff 4 at its lower end 4' is fixed to the said bracket by screws 22 or the like, see Fig. 4.

An actuating member 24 is pivoted at 26 to an extension 23 of the bracket 20. A push rod 30 has a forward end 30' pivoted at 32 to a rear portion 11 of the upper blade 10 and a rear end pivoted at 34 to one end of actuator 24, as shown in Fig. 4.

Swinging of the actuator 24 clockwise acts through push rod 30 to swing blade 10 by a pushing action to its closed position. That is, the cutting action of the blades is accomplished by pushing the blade 10 towards the blade 8 in a more or less downward direction for an efficient and quick cutting and shearing action.

A handle 36 has side portions secured to opposite sides of the staff by screws 38, rivets or the like as in Figs. 2 and 3. The handle is arranged to extend outwardly away from the staff. An operating lever 40 below the handle has an inner portion 42 between the side portions 37 of the handle and is pivoted thereto at 44. A spring 46 between the handle and operating lever resists movement of the lever towards the handle and urges the lever away from the handle.

An elongated pull rod 48 extends along the staff 4 and its upper end 50 extends through an opening 52 of the lever 40. The lower end 54 of the pull rod is pivoted at 56 to the actuator 24, see Fig. 4.

An axle 60 of a hub 62 of the bracket 20 carries wheels 64 whereby the shear is supported for rolling along the ground.

With the handle in the hand of the user, the operating lever 40 may be squeezed towards the handle so that the pulling action of the pull rod 48 is converted by the actuator to a pushing action of the push rod 30 on the blade 10. Thus, the blades are remotely closed and opened by movement of the lever 40 towards and away from the handle without the necessity of the user of the shear stooping down or bending over.

The action to the pull rod and push rod is such that the upper blade is pushed towards the lower blade rather than being pulled thereagainst thereby to obtain a positive, quick and efficient shearing action of the blades.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Remotely operated shears for grass and the like comprising in combination, upper and lower horizontal blades having inner coacting shearing edges, pivotal connections between rear end portions of said blades for relative swinging thereof in horizontal planes between open and closed positions, a bracket integral with the rear end of said lower blade and an elongated hollow staff extending substantially vertically upwardly from said bracket, an actuating member pivotally connected to said bracket swingable between open and closed positions of said blades, a substantially rigid push rod pivotally connected at opposite ends to a rear portion of said upper blade and to said actuating member, a handle fixed to the upper end of said staff, an operating lever pivotally connected to said handle for swinging towards and away from said handle, an elongated pull rod extending through said staff having a lower end connected to said actuating member and an upper end pivotally connected to said operating lever the pivotal connection of said push rod and actuating member and the pivotal connection of said pull rod and actuating member being relatively spaced on opposite sides of the pivotal connection of said actuating member and bracket whereby said upper blade is pushed to closed position by said push rod as said lever pulls said pull rod.

2. Remotely operated shear construction comprising in combination, a lower shear blade having a bracket secured to the rear end portion thereof, an upper shear blade having a rear end portion pivotally connected to the rear end portion of the lower blade for swinging of said upper blade inwardly towards the lower blade in cutting direction, said blades having inner sharpened coacting edges, wheels journalled on said bracket for rollably supporting said blades from the ground in substantial parallelism therewith, an elongated hollow staff having a lower end fixed to said bracket and extending upwardly from said blades, an actuating lever having opposite ends and being pivoted intermediate said ends to said bracket, an elongated rigid push rod pivotally connected at opposite ends to the rear end of said upper blade and to an end of said actuating lever, a handle fixed to the upper end of said staff, an operating lever pivoted to said handle for swinging thereof towards said handle in swinging of the upper blade towards the lower blade, a pull rod within said staff having an upper end connected to said operating lever for upward pulling movement of said rod as said operating lever is swung towards said handle and a lower end of said rod being pivotally connected to an end of said actuating lever, the pivotal connections of the lower end of the pull rod and said actuating lever and the pivotal connections of the end of push rod and the actuating lever being such that as the pull rod is pulled upwardly by the operating lever the actuating lever is swung in a direction to push the push rod to cause said rod to push on and move the upper blade towards the lower blade.

3. Remotely operated shear construction comprising, a lower shear blade having a bracket secured to the rear end portion thereof, an upper shear blade having a rear end portion pivotally connected to the rear end portion of said lower blade for swinging of said upper blade inwardly towards said lower blade in cutting direction, said lower and upper blades having inner sharpened coacting edges, an elongated hollow staff having a lower end fixed to the bracket of said lower blade and extending upwardly from said lower and upper blades, an actuating lever having opposite ends and being pivoted at a point intermediate the ends to the bracket of said lower blade, an elongated rigid push rod pivotally connected at opposite ends to the rear end of said upper blade and to an end of said actuating lever, a handle fixed to the upper end of said staff, an operating lever pivoted to said handle for swinging thereof towards said handle in swinging of said upper blade towards said lower blade, a pull rod within said staff having an upper end connected to said operating lever for upward pulling movement of said rod as said operating lever is swung towards said handle and a lower end of said rod being pivotally connected to an end of said actuating lever, the pivotal connections of the lower end of said pull rod and said actuating lever and the pivotal connections of the end of said push rod and actuating lever being such that as said pull rod is pulled upwardly by said operating lever said actuating lever is swung in a direction to push said push rod to cause said push rod to push on and move said upper blade towards said lower blade.

References Cited in the file of this patent

UNITED STATES PATENTS

| 1,222,950 | Heidl | Apr. 17, 1917 |
| 1,727,067 | Keefe | Sept. 3, 1929 |
| 1,741,172 | Huxman | Dec. 31, 1929 |
| 1,823,199 | Huxman | Sept. 15, 1931 |